(12) United States Patent
Xue

(10) Patent No.: US 11,793,161 B2
(45) Date of Patent: Oct. 24, 2023

(54) INTELLIGENT WIRELESS ALL-DIRECTIONAL AUTOMATIC PET WATER FOUNTAIN

(71) Applicant: Dongguan ZhiYiHong Hardware & Plastic Co., Ltd, Dongguan (CN)

(72) Inventor: Zhiqi Xue, Guangdong (CN)

(73) Assignee: Dongguan ZhiYiHong Hardware & Plastic Co., Ltd, Dongguan (CN)

( * ) Notice: Subject to any disclaimer, the term of this patent is extended or adjusted under 35 U.S.C. 154(b) by 0 days.

(21) Appl. No.: 17/707,965

(22) Filed: Mar. 30, 2022

(65) Prior Publication Data

US 2023/0157259 A1   May 25, 2023

(30) Foreign Application Priority Data

Nov. 25, 2021 (CN) .......................... 202122916400.5

(51) Int. Cl.
*A01K 7/02* (2006.01)
(52) U.S. Cl.
CPC ................................. *A01K 7/025* (2013.01)
(58) Field of Classification Search
USPC ................................................ 119/74, 75, 72
See application file for complete search history.

(56) References Cited

U.S. PATENT DOCUMENTS

2021/0173480 A1* 6/2021 Osterhout ............. G06F 3/0227

FOREIGN PATENT DOCUMENTS

| CN | 204616701 | * | 9/2015 | ............... A01K 7/06 |
| CN | 110352863 | * | 10/2019 | ............... A01K 7/02 |
| CN | 212697146 | * | 3/2021 | ............... A01K 5/02 |
| CN | 213357781 | * | 6/2021 | ............... C25D 13/22 |
| CN | 113432742 | * | 11/2021 | ............... A01K 7/02 |
| CN | 216088258 | * | 3/2022 | ............... A01K 7/02 |
| EP | 3315022 | * | 5/2018 | ............... A01K 7/02 |
| KR | 20200033216 | * | 3/2020 | ............... A01K 7/02 |
| KR | 102184838 | * | 12/2020 | ............... A01K 7/02 |
| KR | 20220145026 | * | 10/2022 | ............... A01K 7/02 |

* cited by examiner

*Primary Examiner* — Andrea M Valenti

(57) ABSTRACT

The utility model relates to the technical field of a pet water dispenser, and provides an intelligent wireless omnidirectional auto-induction pet water dispenser, including a base, a water pump, a wireless induction device, a water tank, a supporting layer, a top cover and a water outlet device. When a pet is in an induction area, a power supply device is electrified and the water pump starts to work. After the pet leaves the induction area, the power supply device stops electrifying, and the water pump stops working. The water dispenser realizes automatic water delivery under the mutual cooperation of the base, the water pump, the wireless induction device, the water tank, the supporting layer, the top cover, and the water outlet device. A water pump water outlet hole and a water pump water inlet hole are sequentially connected to a water outlet and a water inlet. Positive and negative metal sheets are connected to positive and negative elastic pins. A polymer battery or a dry battery can be changed respectively in the base. In the water dispenser, a front end of the base is upward provided with an omnidirectional intelligent induction head, and an area where a pet is located can be induced omnidirectionally and the power supply device can be controlled through a wireless induction device so that a service is provided for the pet to drink water.

10 Claims, 5 Drawing Sheets

INTELLIGENT WIRELESS ALL-DIRECTIONAL AUTOMATIC PET WATER FOUNTAIN

TECHNICAL FIELD

The utility model relates to the technical field of a pet water dispenser, and in particular, to an intelligent wireless omnidirectional auto-induction pet water dispenser.

BACKGROUND

With the development of the times, there are more and more kinds of domestic pets, and due to the busy work and time constraints of the owners, poor care for pets occurs from time to time. The pet water dispenser is a device capable of providing water drinking service for pets, which generally has the functions of filtering water quality and flowing to output water. However, existing pet water dispensers in the market usually adopt an external power supply mode, and the water pump will stop supplying water after power failure. Therefore, these water dispensers are difficult to use outdoors without power supply. Furthermore, the water dispenser capable of automatically inducing water output in the market has a limited induction range, which is usually insensitive when a pet approaches from the side, resulting in that the pet cannot drink water in time.

SUMMARY

An objective of the utility model is to provide an intelligent wireless omnidirectional auto-induction pet water dispenser.

To achieve the above objective, the utility model provides the following solutions:

an intelligent wireless omnidirectional auto-induction pet water dispenser specifically includes:

a water tank, wherein a water pump water outlet hole and a water pump water inlet hole are formed at the bottom of the water tank;

a supporting layer, wherein the supporting layer is arranged on an upper part of the water tank, several water leakage holes are formed at the bottom of the supporting layer, and a side wall of the supporting layer is provided with a connecting port;

a filtering assembly, arranged in the supporting layer;

a top cover, wherein the top cover is arranged on an upper part of the supporting layer, a water leakage port is formed at the bottom of the top cover, and a mounting hole is formed in a side wall of the top cover;

a water outlet device, wherein the water outlet device passes through the mounting hole and the connecting port to be connected to the water outlet hole of the water pump, and the water outlet device is used to output water for pets to drink;

a base, arranged at the bottom of the water tank;

a water pump, wherein the water pump is arranged in the base, a water inlet is formed at one end of the water pump, a water outlet is formed in an upper surface of the water pump, positive and negative metal sheets are mounted at one end of the water pump opposite to the water inlet, the water outlet is connected to the water pump water outlet hole of the water tank, and the water inlet is connected to the water pump water inlet hole of the water tank;

a wireless induction device, specifically comprising:

an intelligent induction head, wherein the intelligent induction head is arranged at a front end of the base and is used to omnidirectionally induce pets;

an infrared induction plate, wherein the infrared induction plate is used cooperatively with the intelligent induction head and is used to induce a pet when the pet arrives at an induction area;

a control circuit board, wherein the control circuit board is arranged in the base and is electrically connected to the infrared induction plate, positive and negative elastic pins are arranged on a surface of the control circuit board, and the positive and negative elastic pins are connected to the positive and negative metal sheets of the water pump.

Optionally, the intelligent wireless omnidirectional auto-induction pet water dispenser further includes: a power supply device, arranged in the base, connected to the control circuit board and used to supply power for the control circuit board.

Optionally, the power supply device includes a battery and a start button, and the battery is a polymer battery or a dry battery.

Optionally, the power supply device further includes: a battery cover plate, arranged on the base and used to seal the dry battery.

Optionally, the intelligent wireless omnidirectional auto-induction pet water dispenser further includes: a base cover, used to seal the base.

Optionally, the filtering assembly includes a filter element and filtering sponge.

Optionally, the water outlet device includes a water channel and a cover plate, one end of the water channel passes through the mounting hole and the connecting port to be connected to the water pump water outlet hole, and the cover plate is arranged on the water channel.

Optionally, the intelligent wireless omnidirectional auto-induction pet water dispenser further includes:

a water level detection probe, arranged on a surface of the control circuit board;

an electric quantity indicator lamp, arranged on a surface of the infrared induction plate and used to perform electric quantity warning when the electric quantity is insufficient;

a water shortage and power failure indicator lamp, arranged on a surface of the infrared induction plate and used to perform water level warning when a current water level value is less than a preset minimum water level value.

Optionally, a water pump cover is arranged in the water tank base, and the water pump cover is used to encapsulate the water pump in the water tank base.

Optionally, the intelligent wireless omnidirectional auto-induction pet water dispenser further includes: a residue blocking cover, wherein the residue blocking cover is arranged in the water tank, one end of the residue blocking cover is connected to the water pump water inlet hole, and the residue blocking cover is used to filter granular impurities in water.

According to specific embodiments provided by the utility model, the utility model discloses the following technical effects:

the utility model provides an intelligent wireless omnidirectional auto-induction pet water dispenser, including:

a water tank, a water pump and a wireless induction device. The water tank can complete water filtering and flowing; the wireless induction device can induce an area where a pet is located and control the work of the water pump; when the pet is within the induction area, the wireless induction device enables the water pump to start to work; after the pet leaves the induction area, the wireless induction device enables the water pump to stop work; and the intelligent wireless omnidirectional auto-induction pet water dispenser can omnidirectionally sense the pet and provide water drinking service for pets.

BRIEF DESCRIPTION OF THE DRAWINGS

To describe the technical solutions in the embodiments of the utility model or in the prior art more clearly, the accompanying drawings to be used in the embodiments are briefly introduced below. Apparently, the accompanying drawings in the following description show merely some embodiments of the utility model, and a person of ordinary skill in the art can still derive other drawings from these accompanying drawings without inventive efforts.

REFERENCE NUMERAL DESCRIPTION

Water tank—1, water pump water outlet hole—2, water pump water inlet hole—3, supporting layer—4, water leakage hole—5, connecting port—6, filter element—7, filtering sponge—8, top cover—9, water leakage port—10, mounting hole—11, water channel—12, cover plate—13, base—14, water pump—15, water inlet—16, water outlet—17, positive and negative metal sheets—18, intelligent induction head—19, infrared induction plate—20, control circuit board—21, positive and negative elastic pins 22, polymer battery—23, start button—24, battery cover plate—25, base cover—26, water level detection probe—27, electric quantity indicator lamp—28, water shortage and power failure indicator lamp—29, water pump cover—30, foot pad—31, charging port—32.

DETAILED DESCRIPTION OF EMBODIMENTS

The technical solutions in the embodiments of the utility model are described below clearly with reference to the accompanying drawings in the embodiments of the utility model. Apparently, the described embodiments are a part, but not all the embodiments of the utility model. All other embodiments obtained by a person of ordinary skill in the art based on the embodiments of the utility model without inventive efforts fall within the scope of protection of the utility model.

An objective of the utility model is to provide an intelligent wireless omnidirectional auto-induction pet water dispenser, which can omnidirectionally monitor pets and can automatically output water when pets arrive at an induction range.

To make the above objective, characteristics and advantages of the utility model more understandable, the utility model will be further described below in detail in combination with the accompanying drawings and specific embodiments.

Embodiment 1

Figure 1:
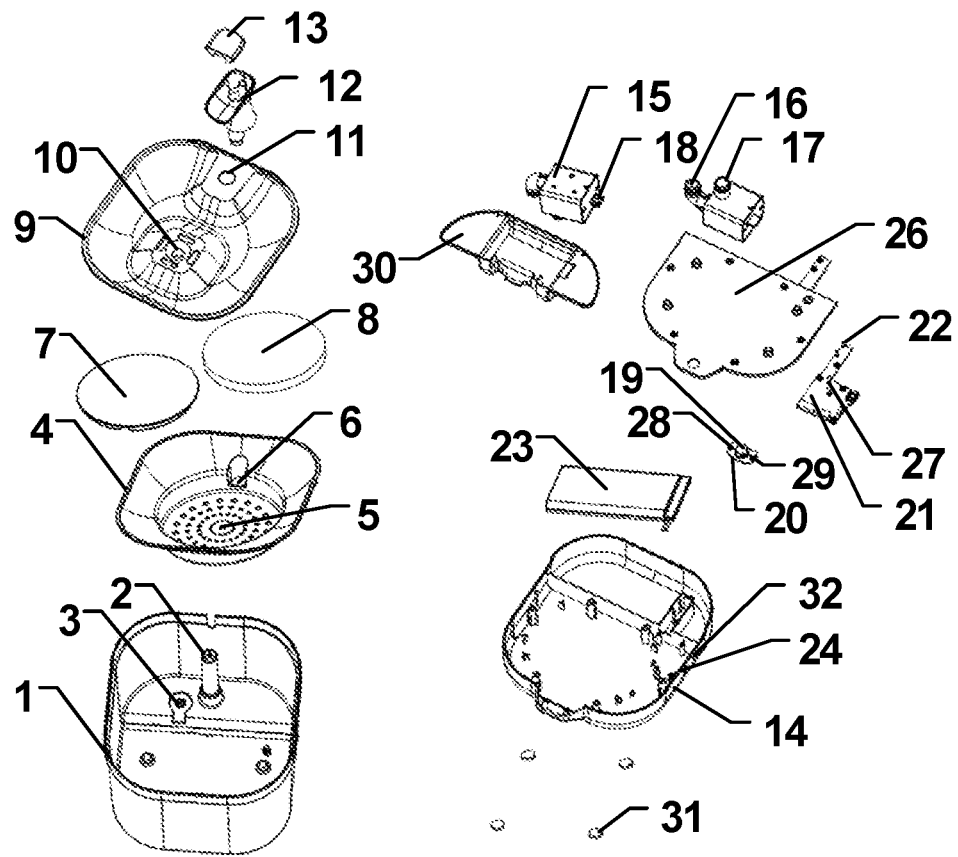
FIG. 1 is a structural explosive view of an intelligent wireless omnidirectional auto-induction pet water dispenser embodiment 1 according to the utility model.
Figure 3:
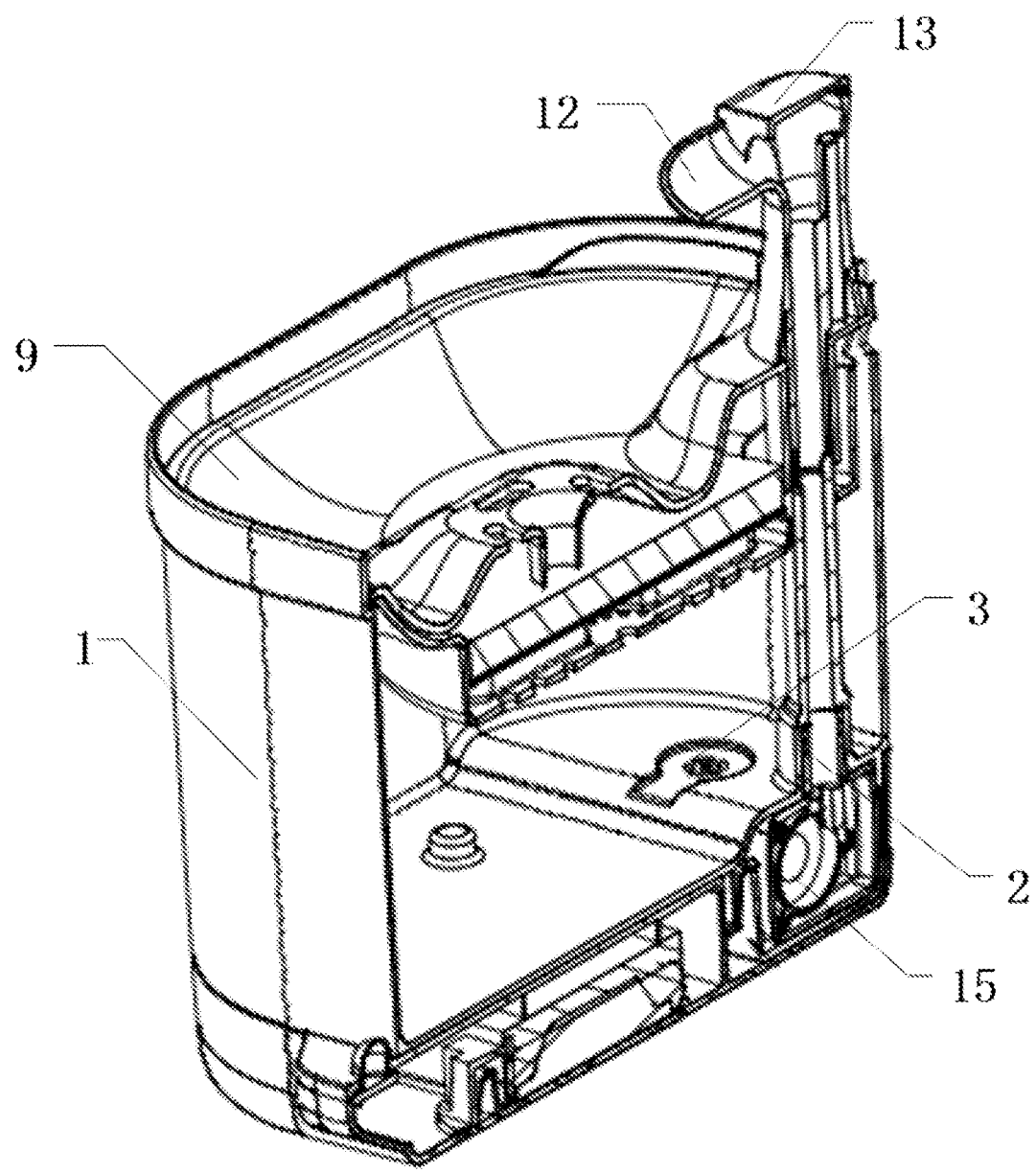
FIG. 3 is a schematic semi-section view of an intelligent wireless omnidirectional auto-induction pet water dispenser embodiment according to the utility model.
Figure 4:
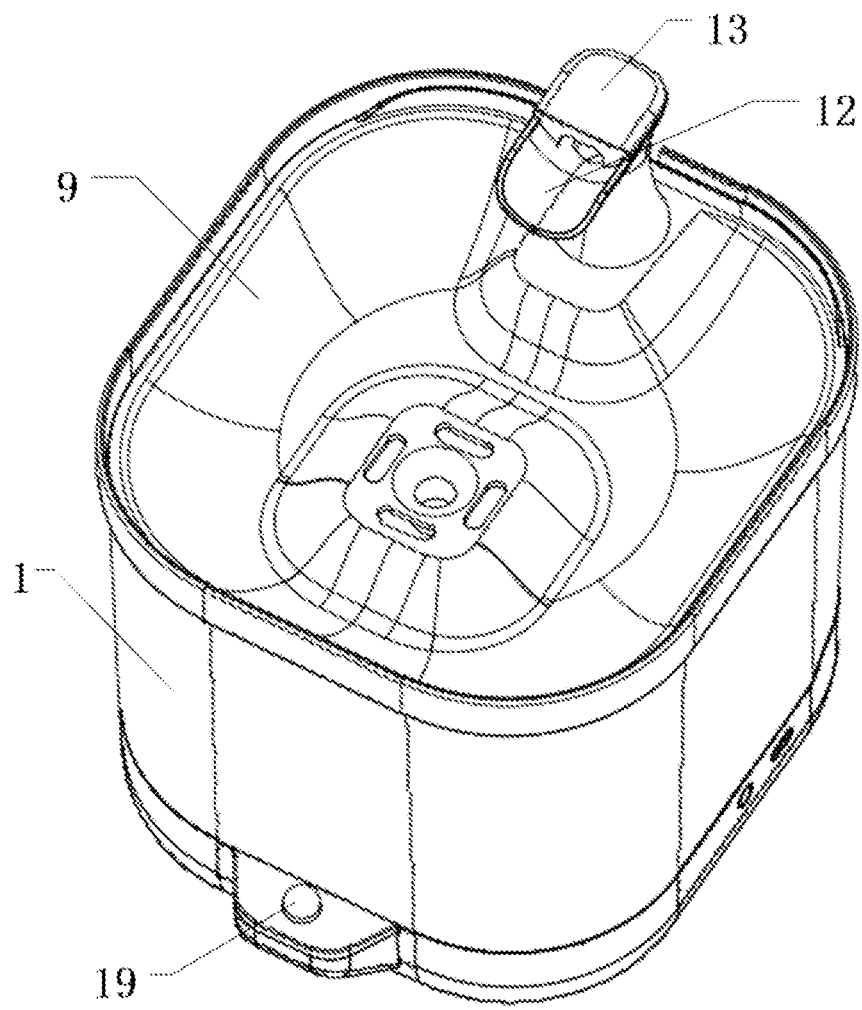
FIG. 4 is a schematic diagram of a combined state of an intelligent wireless omnidirectional auto-induction pet water dispenser embodiment according to the utility model.
Figure 5:
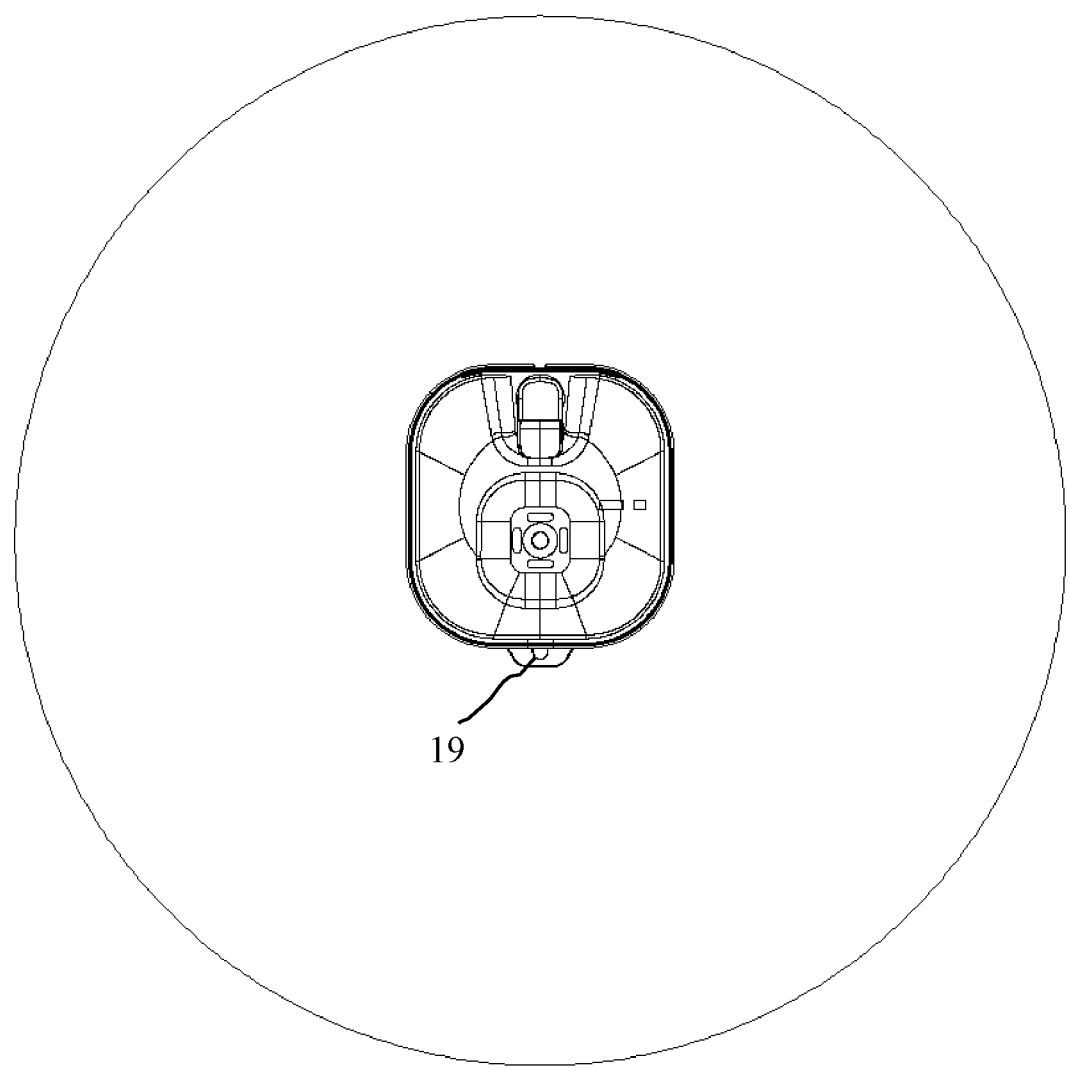
FIG. 5 is an induction azimuth schematic diagram of vertical placement of an intelligent wireless omnidirectional auto-induction pet water dispenser embodiment according to the utility model. Specifically, as shown in the schematic diagram of the vertical sensing orientation of the embodiment of the intelligent wireless omnidirectional auto-induction pet water dispenser in FIG. 5, the circle range with a radius of 1.5 meters and the intelligent induction head 19 as the center is the induction area of the intelligent wireless omnidirectional auto-induction pet water dispenser. When the pet arrives in the induction area, the control circuit board 21 energizes the water pump 15, and the water pump 15 starts to work. After the pet leaves the induction area for 60 seconds, the control circuit board 21 stops energizing the water pump 15 to stop it from working. The intelligent induction head 19 that adopts vertical placement can increase the induction range and more effectively sense the approach of pets from all directions.

In this embodiment, referring to FIG. 1, FIG. 3, FIG. 4 and FIG. 5, the intelligent wireless omnidirectional auto-induction pet water dispenser in this embodiment includes: a water tank 1, a supporting layer 4, a filtering assembly, a top cover 9, a water outlet device, a base 14, a water pump 15 and a wireless induction device.

Specifically, a water pump water outlet hole 2 and a water pump water inlet hole 3 are formed at the bottom of the water tank 1; the supporting layer 4 is arranged on an upper part of the water tank 1, several water leakage holes 5 are formed at the bottom of the supporting layer 4, and a side wall of the supporting layer 4 is provided with a connecting port 6; the filtering assembly is arranged in the supporting layer 4; the top cover 9 is arranged on an upper part of the supporting layer 4, a water leakage port 10 is formed at the bottom of the top cover 9, and a mounting hole 11 is formed at a side wall of the top cover; the water outlet device passes through the mounting hole 11 and the connecting port 6 to be connected to the water pump water outlet hole 2, and the water outlet device is used to output water for pets to drink; the base 14 is arranged at the bottom of the water tank 1; the water pump 15 is arranged in the base 14, a water inlet 16 is formed at one end of the water pump 15, a water outlet 17 is formed on an upper surface of the water pump 15, positive and negative metal sheets 18 are mounted at one end of the water pump 15 opposite to the water inlet 16, the water outlet 17 is connected to the water pump water outlet hole 2 of the water tank 1, and the water inlet 16 is connected to the water pump water inlet hole 3 of the water tank 1; and the wireless induction device specifically includes: an intelligent induction head 19, an infrared induction plate 20 and a control circuit board 21. The intelligent induction head 19 is arranged at a front end of the base 14 and is used to omnidirectionally sense pets; the infrared induction plate 20 is used cooperatively with the intelligent induction head 19 and is used to sense a pet when the pet arrives at an induction area; the control circuit board 21 is arranged in the base 14 and is electrically connected to the infrared induction plate 20; and positive and negative elastic pins 22 are formed on a surface of the control circuit board 21, and the positive and negative elastic pins 22 are connected to the positive and negative metal sheets 18 of the water pump.

Specifically, the top cover 9 is removable, and the wireless induction device can sense an area where a pet is located and can control a power supply device to supply power for the water pump 15 to work. When the water pump 15 works, water flows out of the water outlet device through the action force of the water pump 15 for pets to drink.

Specifically, the intelligent wireless omnidirectional auto-induction pet water dispenser further includes: a power supply device, arranged in the base 14, connected to the control circuit board 21 and used to supply power for the control circuit board 21.

Specifically, the power supply device includes a battery and a start button 24, and the battery is a polymer battery 23.

Specifically, the control circuit board 21 is further provided with an external power interface, the external power interface is connected to a charging port 32, and the charging port 32 is used to charge the polymer battery 23.

Specifically, the polymer battery 23 is an 8000 mAh polymer lithium battery, and the periphery of the polymer battery 23 is limited by a bone position of the base 14.

Specifically, the intelligent wireless omnidirectional auto-induction pet water dispenser further includes: a base cover 26, and the base cover 26 is connected to the base 14 through a screw to seal the base 14.

Specifically, the filtering assembly includes a filter element 7 and filtering sponge 8, and can filter and clean water quality.

Specifically, the water outlet device includes a water channel 12 and a cover plate 13, one end of the water channel 12 passes through the mounting hole 11 and the connecting port 6 to be connected to the water pump water outlet hole 2, and the cover plate 13 is arranged on the water channel 12.

Specifically, the water channel 12 and the cover plate 13 adopt transparent materials.

Specifically, when a pet is within 1.5 M of the induction area, the control circuit board 21 electrifies the water pump 15 and the water pump 15 starts to work; 60 seconds after the pet leaves the induction area, the control circuit board 21 stops electrifying the water pump 15, so that the water pump 15 stops work; and the intelligent induction head 19 is placed vertically, so that the induction range can be enlarged, and the situation that the pet approaches from all directions can be sensed more effectively.

Specifically, the intelligent wireless omnidirectional auto-induction pet water dispenser further includes: a water level probe 27, an electric quantity indicator lamp 28 and a water shortage and power failure indicator lamp 29. The water level detection probe 27 is arranged on a surface of the control circuit board 21; the electric quantity indicator lamp 28 is arranged on a surface of the infrared induction plate 20 and is used to perform electric quantity warning when the electric quantity is insufficient; and the water shortage and power failure indicator lamp 29 is arranged on a surface of the infrared induction plate 20 and is used to perform water level warning when a current water level value is less than a preset minimum water level value.

Specifically, when the water level is 1-5 MM lower than the surface of the water level detection probe 27, the control circuit board 21 controls the power supply device to stop supplying power to the water pump 15, and at the same time, the water shortage and power failure indicator lamp 29 is on in red.

Specifically, the control circuit board 21 may detect the electric quantity of the battery to realize electric quantity warning, and may also detect the water level to realize water level warning; when the electric quantity is 80-100%, the electric quantity indicator lamp 28 is on in green; when the electric quantity is 79-30%, the electric quantity indicator lamp 28 is on in blue; when the electric quantity is 29-20%, the electric quantity indicator lamp 28 is on in red; when the electric quantity is below 20%, the electric quantity indicator lamp 28 flashes in red for 5 minutes and then automatically powers off; the polymer battery 23 can be charged through an external power supply; during charging, the electric quantity indicator lamp 28 flashes in green; and after 100% charging, the electric quantity indicator lamp 28 is normally on in green.

Specifically, a water pump cover 30 is arranged in the water tank base 14, and the water pump cover 30 is used to encapsulate the water pump 15 in the water tank base 14.

Specifically, the intelligent wireless omnidirectional auto-induction pet water dispenser further includes: a residue blocking cover, wherein the residue blocking cover is arranged in the water tank 1, one end of the residue blocking cover is connected to the water pump water inlet hole 3, and the residue blocking cover is used to filter granular impurities in water.

Specifically, the intelligent wireless omnidirectional auto-induction pet water dispenser further includes a foot pad 31, wherein the foot pad 31 is arranged on the base 14, so that the intelligent wireless omnidirectional auto-induction pet water dispenser is more anti-skid when being in contact with the ground.

Embodiment 2

Figure 2:
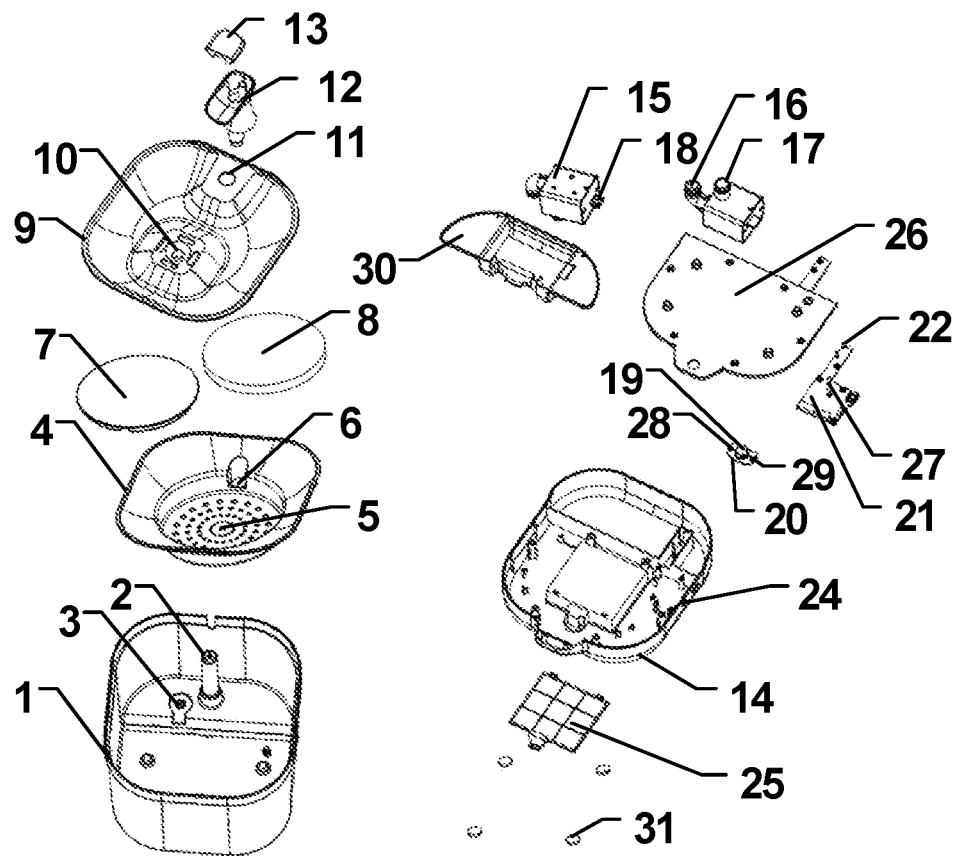
FIG. 2 is a structural explosive view of an intelligent wireless omnidirectional auto-induction pet water dispenser embodiment 2 according to the utility model.

In this embodiment, referring to FIG. 2 to FIG. 5, the intelligent wireless omnidirectional auto-induction pet water dispenser in this embodiment includes: a water tank 1, a supporting layer 4, a filtering assembly, a top cover 9, a water outlet device, a base 14, a water pump 15 and a wireless induction device.

Specifically, a water pump water outlet hole 2 and a water pump water inlet hole 3 are formed at the bottom of the water tank 1; the supporting layer 4 is arranged on an upper part of the water tank 1, several water leakage holes 5 are formed at the bottom of the supporting layer 4, and a side wall of the supporting layer 4 is provided with a connecting port 6; the filtering assembly is arranged in the supporting layer 4; the top cover 9 is arranged on an upper part of the supporting layer 4, a water leakage port 10 is formed at the bottom of the top cover 9, and a mounting hole 11 is formed at a side wall of the top cover; the water outlet device passes through the mounting hole 11 and the connecting port 6 to be connected to the water pump water outlet hole 2, and the water outlet device is used to output water for pets to drink; the base 14 is arranged at the bottom of the water tank 1; the water pump 15 is arranged in the base 14, a water inlet 16 is formed at one end of the water pump 15, a water outlet 17 is formed on an upper surface of the water pump 15, positive and negative metal sheets 18 are mounted at one end of the water pump 15 opposite to the water inlet 16, the water outlet 17 is connected to the water pump water outlet hole 2 of the water tank 1, and the water inlet 16 is connected to the water pump water inlet hole 3 of the water tank 1; and the wireless induction device specifically includes: an intelligent induction head 19, an infrared induction plate 20 and a control circuit board 21. The intelligent induction head 19 is arranged at a front end of the base 14 and is used to omnidirectionally sense pets; the infrared induction plate 20 is used cooperatively with the intelligent induction head 19 and is used to sense a pet when the pet arrives at an induction area; the control circuit board 21 is arranged in the base 14 and is electrically connected to the infrared induction plate 20; and positive and negative elastic pins 22 are formed on a surface of the control circuit board 21, and the positive and negative elastic pins 22 are connected to the positive and negative metal sheets 18 of the water pump.

Specifically, the top cover 9 is removable, and the wireless induction device can sense an area where a pet is located and can control a power supply device to supply power for the water pump 15 to work. When the water pump 15 works, water flows out of the water outlet device through the action force of the water pump 15 for pets to drink.

Specifically, the intelligent wireless omnidirectional auto-induction pet water dispenser further includes: a power supply device, arranged in the base 14, connected to the control circuit board 21 and used to supply power for the control circuit board 21.

Specifically, the power supply device includes a battery and a start button 24, and the battery is a dry battery.

Specifically, the dry battery includes four AA-size batteries, the dry battery is mounted in a battery compartment, and the infrared induction plate 20 and a battery spring arranged in the battery compartment is connected to the control circuit board 21 through a socket.

Specifically, the intelligent wireless omnidirectional auto-induction pet water dispenser further includes: a battery cover plate, arranged at the bottom of the base 14 and used to encapsulate the battery in the base 14.

Specifically, the intelligent wireless omnidirectional auto-induction pet water dispenser further includes: a base cover 26, and the base cover 26 is connected to the base 14 through a screw to seal the base 14.

Specifically, the filtering assembly includes a filter element 7 and filtering sponge 8, and can filter and clean water quality.

Specifically, the water outlet device includes a water channel 12 and a cover plate 13, one end of the water channel 12 passes through the mounting hole 11 and the connecting port 6 to be connected to the water pump water outlet hole 2, and the cover plate 13 is arranged on the water channel 12.

Specifically, the water channel 12 and the cover plate 13 adopt transparent materials.

Specifically, when a pet is within 1.5 M of the induction area, the control circuit board 21 electrifies the water pump 15 and the water pump 15 starts to work; 60 seconds after the pet leaves the induction area, the control circuit board 21 stops electrifying the water pump 15, so that the water pump 15 stops work; and the intelligent induction head 19 is placed vertically, so that the induction range can be enlarged, and the situation that the pet approaches from all directions can be sensed more effectively.

Specifically, the intelligent wireless omnidirectional auto-induction pet water dispenser further includes: a water level probe 27, an electric quantity indicator lamp 28 and a water shortage and power failure indicator lamp 29. The water level detection probe 27 is arranged on a surface of the control circuit board 21; the electric quantity indicator lamp 28 is arranged on a surface of the infrared induction plate 20 and is used to perform electric quantity warning when the electric quantity is insufficient; and the water shortage and power failure indicator lamp 29 is arranged on a surface of the infrared induction plate 20 and is used to perform water level warning when a current water level value is less than a preset minimum water level value.

Specifically, when the water level is 1-5 MM lower than the surface of the water level detection probe 27, the control circuit board 21 controls the power supply device to stop supplying power to the water pump 15, and at the same time, the water shortage and power failure indicator lamp 29 is on in red.

Specifically, the control circuit board 21 may detect the electric quantity of the battery to realize electric quantity warning, and may also detect the water level to realize water level warning; when the electric quantity is 80-100%, the electric quantity indicator lamp 28 is on in green; when the electric quantity is 79-30%, the electric quantity indicator lamp 28 is on in blue; when the electric quantity is below 29-20%, the electric quantity indicator lamp 28 is on in red; and when the electric quantity is 0, it is necessary to change the dry battery to achieve the continuous power supply effect of the water dispenser.

Specifically, a water pump cover 30 is arranged in the water tank base 14, and the water pump cover 30 is used to encapsulate the water pump 15 in the water tank base 14.

Specifically, the intelligent wireless omnidirectional auto-induction pet water dispenser further includes: a residue blocking cover, wherein the residue blocking cover is arranged in the water tank 1, one end of the residue blocking cover is connected to the water pump water inlet hole 3, and the residue blocking cover is used to filter granular impurities in water.

Specifically, the intelligent wireless omnidirectional auto-induction pet water dispenser further includes a foot pad 31, wherein the foot pad 31 is arranged on the base 14, so that the intelligent wireless omnidirectional auto-induction pet water dispenser is more anti-skid when being in contact with the ground.

The utility model provides an intelligent wireless omnidirectional auto-induction pet water dispenser. The wireless induction device arranged in the water tank can induce the area where the pet is located and control the power supply device, so that the power supply device supplies power to make the wireless water pump to operate; the activity range of the pet can be induced omnidirectionally by the wireless induction device; when the pet is within the induction area, the control circuit board energizes the wireless water pump and the wireless water pump starts to work; and after the pet leaves the induction area, the power supply device stops energizing the wireless water pump, so that the wireless water pump stops work. The polymer battery pack and the dry battery pack can be respectively replaced in the water tank, and users can select different power supply modes according to different occasion requirements, so that the intelligent wireless omnidirectional auto-induction pet water dispenser is wider in application range and more convenient to use.

Each example of the present specification is described in a progressive manner, each example focuses on the difference from other examples, and the same and similar parts between the examples may refer to each other.

Specific examples are used for illustration of the principles and implementation methods of the utility model. The description of the above embodiments is used to help illustrate the method and its core principles of the utility model. In addition, a person of ordinary skill in the art can make various modifications in terms of specific implementation manners and application scope in accordance with the teachings of the utility model. In conclusion, the content of this specification shall not be construed as a limitation to the present invention.

What is claimed is:
1. An intelligent wireless omnidirectional auto-induction pet water dispenser, comprising:
   a water tank, wherein a water pump water outlet hole and a water pump water inlet hole are formed at the bottom of the water tank;

a supporting layer, wherein the supporting layer is arranged on an upper part of the water tank, several water leakage holes are formed at the bottom of the supporting layer, and a side wall of the supporting layer is provided with a connecting port;

a filtering assembly, arranged in the supporting layer;

a top cover, wherein the top cover is arranged on an upper part of the supporting layer, a water leakage port is formed at the bottom of the top cover, and a mounting hole is formed in a side wall of the top cover;

a water outlet device, wherein the water outlet device passes through the mounting hole and the connecting port to be connected to the water outlet hole of the water pump, and the water outlet device is used to output water for pets to drink;

a base, arranged at the bottom of the water tank;

a water pump, wherein the water pump is arranged in the base, a water inlet is formed at one end of the water pump, a water outlet is formed in an upper surface of the water pump, positive and negative metal sheets are mounted at one end of the water pump opposite to the water inlet, the water outlet is connected to the water pump water outlet hole of the water tank, and the water inlet is connected to the water pump water inlet hole of the water tank; and a wireless induction device, specifically comprising:

an intelligent induction head, wherein the intelligent induction head is arranged at a front end of the base and is used to omnidirectionally induce pets, an infrared induction plate, wherein the infrared induction plate is used cooperatively with the intelligent induction head and is used to induce a pet when the pet arrives at an induction area, and a control circuit board, wherein the control circuit board is arranged in the base and is electrically connected to the infrared induction plate, positive and negative elastic pins are arranged on a surface of the control circuit board, and the positive and negative elastic pins are connected to the positive and negative metal sheets of the water pump.

2. The intelligent wireless omnidirectional auto-induction pet water dispenser according to claim 1, further comprising:

a power supply device, arranged in the base, connected to the control circuit board and used to supply power for the control circuit board.

3. The intelligent wireless omnidirectional auto-induction pet water dispenser according to claim 2, wherein the power supply device comprises a battery and a start button, and the battery is a polymer battery or a dry battery.

4. The intelligent wireless omnidirectional auto-induction pet water dispenser according to claim 3, wherein the power supply device further comprises:

a battery cover plate, arranged on the base and used to seal the dry battery.

5. The intelligent wireless omnidirectional auto-induction pet water dispenser according to claim 1, further comprising:

a base cover, used to seal the base.

6. The intelligent wireless omnidirectional auto-induction pet water dispenser according to claim 1, wherein the filtering assembly comprises a filter element and filtering sponge.

7. The intelligent wireless omnidirectional auto-induction pet water dispenser according to claim 1, wherein the water outlet device comprises a water channel and a cover plate, one end of the water channel passes through the mounting hole and the connecting port to be connected to the water pump water outlet hole, and the cover plate is arranged on the water channel.

8. The intelligent wireless omnidirectional auto-induction pet water dispenser according to claim 1, further comprising:

a water level detection probe, arranged on a surface of the control circuit board;

an electric quantity indicator lamp, arranged on a surface of the infrared induction plate and used to perform electric quantity warning when the electric quantity is insufficient; and a water shortage and power failure indicator lamp, arranged on a surface of the infrared induction plate and used to perform water level warning when a current water level value is less than a preset minimum water level value.

9. The intelligent wireless omnidirectional auto-induction pet water dispenser according to claim 1, wherein a water pump cover is arranged in the water tank base, and the water pump cover is used to encapsulate the water pump in the water tank base.

10. The intelligent wireless omnidirectional auto-induction pet water dispenser according to claim 1, further comprising:

a residue blocking cover, wherein the residue blocking cover is arranged in the water tank, one end of the residue blocking cover is connected to the water pump water inlet hole, and the residue blocking cover is used to filter granular impurities in water.

* * * * *